(12) United States Patent
Orth et al.

(10) Patent No.: US 6,907,790 B2
(45) Date of Patent: Jun. 21, 2005

(54) GAGE PRESSURE OUTPUT FROM AN ABSOLUTE PRESSURE MEASUREMENT DEVICE

(75) Inventors: Kelly M. Orth, Apple Valley, MN (US); Mark S. Schumacher, Minneapolis, MN (US)

(73) Assignee: Rosemount Inc., Eden Prairie, MN (US)

( * ) Notice: Subject to any disclaimer, the term of this patent is extended or adjusted under 35 U.S.C. 154(b) by 66 days.

(21) Appl. No.: 10/394,524

(22) Filed: Mar. 21, 2003

(65) Prior Publication Data

US 2004/0182167 A1 Sep. 23, 2004

(51) Int. Cl.[7] ................................................ G01L 9/00
(52) U.S. Cl. .................................... 73/753; 73/716
(58) Field of Search ............................. 73/700–756

(56) References Cited

U.S. PATENT DOCUMENTS

| | | | |
|---|---|---|---|
| 4,414,851 A | * 11/1983 | Maglic | 73/706 |
| 4,536,719 A | * 8/1985 | Baum et al. | 331/37 |
| 4,818,994 A | 4/1989 | Orth et al. | 340/870.21 |
| 5,606,513 A | 2/1997 | Louwagie et al. | 364/510 |
| 5,756,899 A | * 5/1998 | Ugai et al. | 73/714 |
| 5,870,695 A | 2/1999 | Brown et al. | 702/138 |
| 5,899,962 A | 5/1999 | Louwagie et al. | 702/138 |
| 6,050,145 A | 4/2000 | Olson et al. | 73/706 |
| 6,305,944 B1 | 10/2001 | Henry et al. | 439/22 |
| 6,473,711 B1 | * 10/2002 | Sittler et al. | 702/138 |
| 6,508,131 B2 | * 1/2003 | Frick | 73/756 |
| 2002/0007681 A1 | 1/2002 | Fandrey et al. | 73/753 |
| 2002/0108448 A1 | 8/2002 | Behm et al. | 73/753 |

OTHER PUBLICATIONS

International Search Report for International Application No. PCT/US2004/007389, filed Mar. 11, 2004, dated Jul. 22, 2004.

* cited by examiner

*Primary Examiner*—William Oen
*Assistant Examiner*—Jermaine Jenkins
(74) *Attorney, Agent, or Firm*—Westman, Champlin & Kelly

(57) ABSTRACT

A pressure measurement device comprising an absolute pressure sensor and a bus coupling serial communication and energization to an electrical connector in a field wiring compartment. An atmospheric pressure sensor module is connected to the bus at the electrical connector. The bus provides the energization to the atmospheric pressure sensor module and the bus receives a serial communication signal from the atmospheric pressure sensor module. The serial communication signal includes numeric data representing atmospheric pressure. The pressure measurement device provides a gage pressure output as a calculated difference between the sensed absolute pressure and the received numeric data.

20 Claims, 10 Drawing Sheets

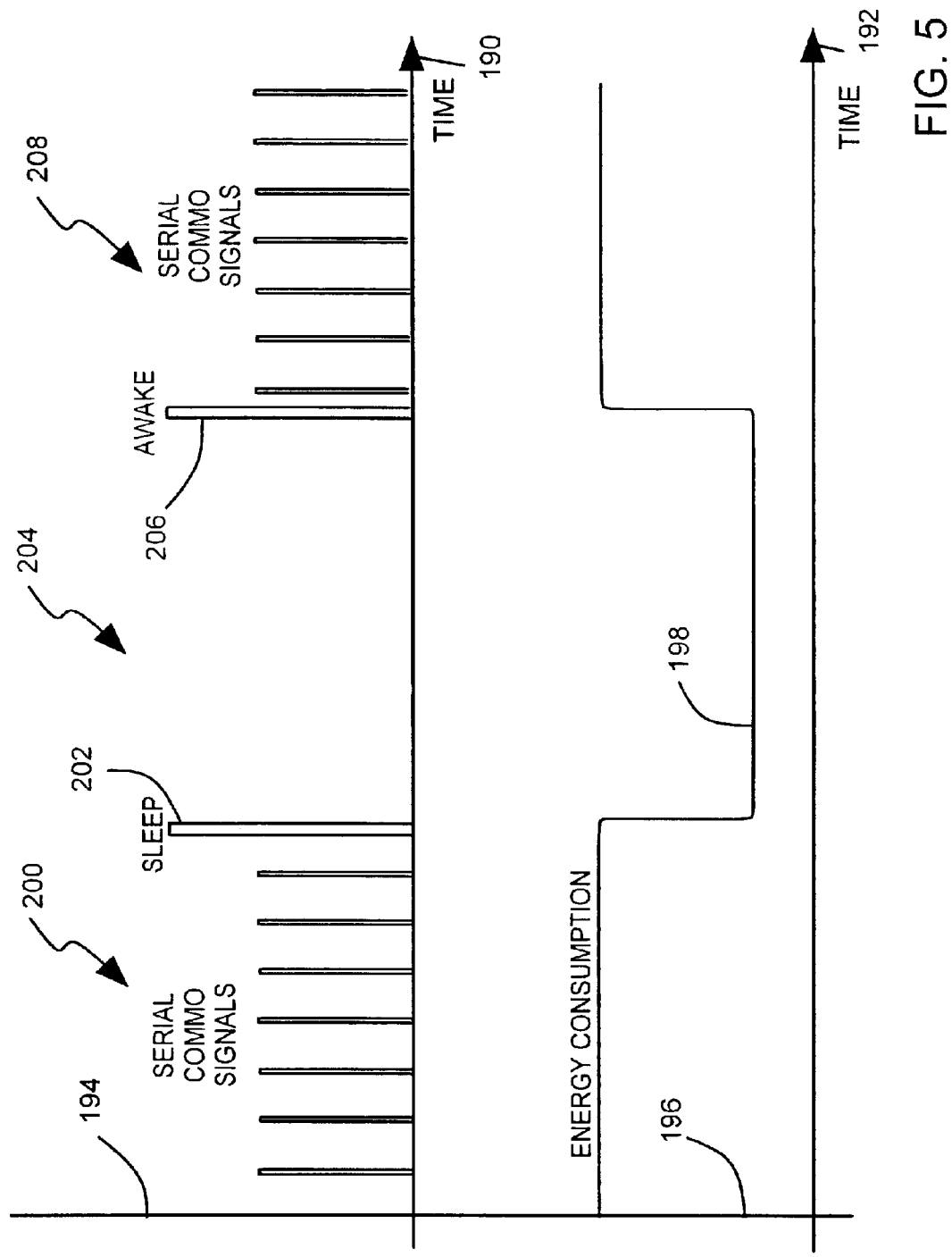

GAGE PRESSURE OUTPUT FROM AN ABSOLUTE PRESSURE MEASUREMENT DEVICE

FIELD OF THE INVENTION

The present invention relates to pressure sensing instruments for use in monitoring industrial process fluids. In particular, the invention relates to pressure measurement devices that sense absolute pressure of an industrial process fluid.

BACKGROUND OF THE INVENTION

Pressure measurement devices are manufactured in different configurations in order to be installable in different applications for a wide variety of pressure and flow measurement needs. Variations of pressure measurement device configurations can include, for example, 5 different pressure ranges, 5 different isolator diaphragm materials, 4 different process flange materials, two different types of isolator fluid fills, gage or absolute pressure outputs, single or dual inlet, and other variations of construction to meet varying worldwide industrial safety and compatibility standards. Hundreds of variations of pressure measurement device configurations need to be available, and the problems of manufacturing and inventorying pressure measurement devices with so many different variations is expensive both for the manufacturer as well as the end user.

When an absolute pressure measurement device is installed in an industrial location, the need arises for periodic calibration using a pressure standard. Pressure standards, however, such as dead weight testers are usually calibrated in gage pressure units and an accurate calibration of the absolute pressure measurement device is difficult to perform in a field location.

An arrangement is needed to reduce the number of variations of types of pressure sensing instruments while still meeting the user's application and calibration needs for all of the variations. An arrangement is also needed for conveniently calibrating absolute pressure measurement instruments using gage pressure calibration standards.

SUMMARY OF THE INVENTION

Disclosed is a pressure measurement device comprising an absolute pressure sensor that couples to a pressurized process fluid inlet and that provides a process sensor output representing absolute pressure of the process fluid.

The pressure measurement device includes a bus coupling serial communication and energization to an electrical connector in a field wiring compartment. An atmospheric pressure sensor module is connected to the bus at the electrical connector. The bus provides the energization to the atmospheric pressure sensor module and the bus receives a serial communication signal from the atmospheric pressure sensor module. The serial communication signal includes numeric data representing atmospheric pressure.

The pressure measurement device includes a circuit that receives the process sensor output and receives the serial communication signal from the bus. The circuit provides a gage pressure output couplable to the control system as a calculated difference between the sensed absolute pressure and the received numeric data.

These and various other features as well as advantages that characterize the present invention will be apparent upon reading of the following detailed description and review of the associated drawings.

BRIEF DESCRIPTION OF THE DRAWINGS

FIG. 5 illustrates a timing diagram of sleep and awake modes of an atmospheric pressure sensor module.

DETAILED DESCRIPTION OF ILLUSTRATIVE EMBODIMENTS

In the embodiments described below, it is possible for the manufacturer and end user to avoid having to manufacture or inventory any gage pressure measurement devices. The manufacturer or end user can inventory absolute pressure measurement devices, and then add an atmospheric pressure sensor module, when needed, to effectively convert an absolute pressure device to a device that functions like a gage pressure measurement device.

The arrangement also makes it possible to conveniently calibrate absolute pressure measurement devices using a gage pressure standard such as a dead weight tester. During calibration, the atmospheric pressure sensor module can be temporarily connected to a field electrical connector, and the pressure measuring device then provides a gage pressure output. Calibration can be conveniently performed because both the pressure sensing device and the gage pressure standard both provide gage pressure outputs that can be conveniently compared. After calibration is complete, the atmospheric pressure sensor module can be removed and the pressure sensing device can revert back to providing an absolute pressure output to the control system.

In one preferred arrangement, the pressure measurement device is configured to provide serial communications to the control system, and the serial communications include both absolute and gage pressure readings to the control system. In this preferred arrangement, the pressure measurement device can be calibrated using its gage output and the absolute output will also be calibrated.

Figure 1:
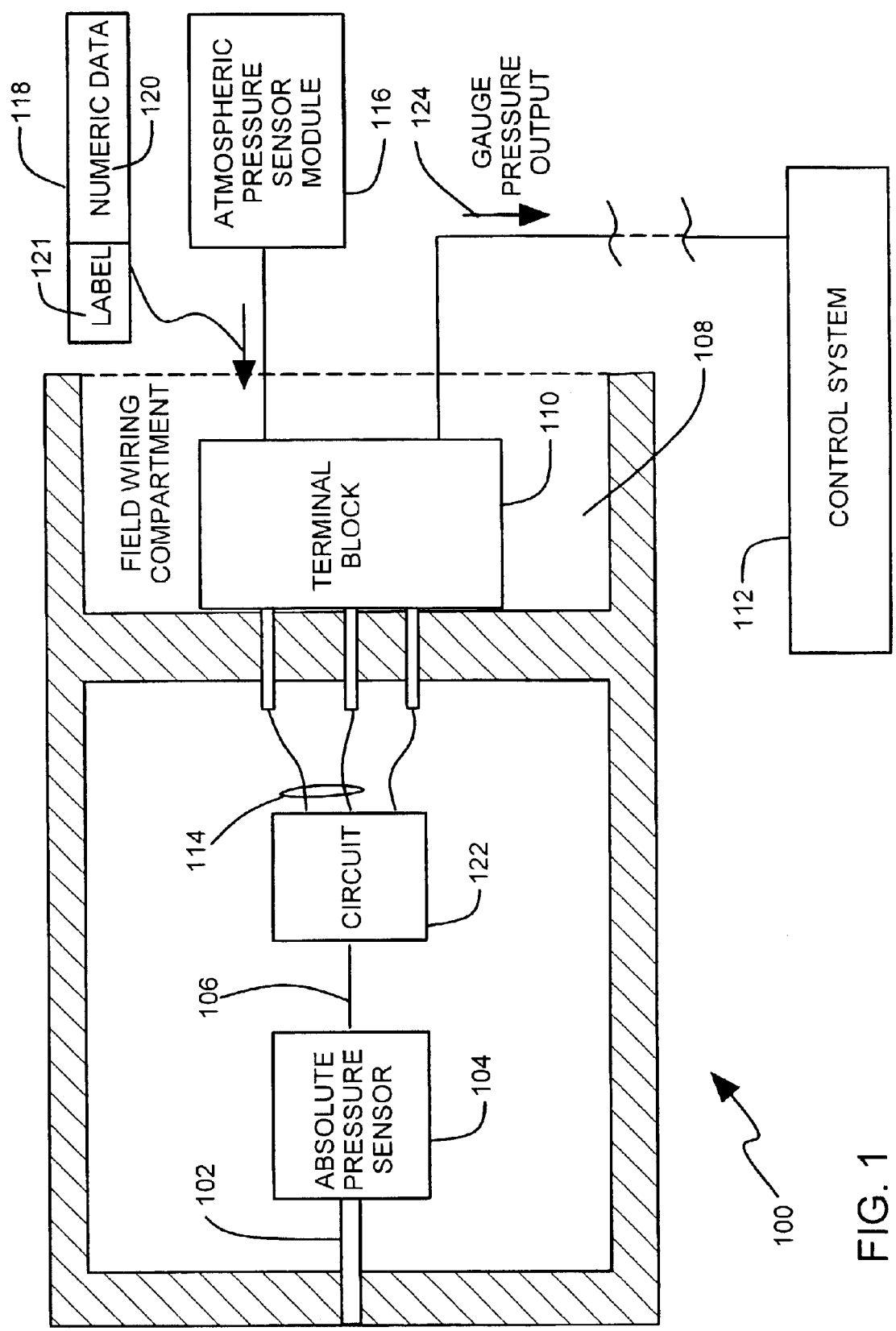
FIG. 1 illustrates a block diagram of an embodiment of a pressure measurement device.

FIG. 1 illustrates a block diagram of an embodiment of a pressure measurement device 100. The pressure measurement device 100 comprises an inlet 102 that couples to a pressurized process fluid (not illustrated in FIG. 1). An absolute pressure sensor 104 couples to the inlet 102 and provides a process sensor output 106 that represents absolute pressure of the process fluid.

"Absolute pressure" means a pressure relative to a vacuum or absolute zero pressure. Absolute pressure is distinguishable from "gage pressure," which is a pressure measured or calculated relative to the ambient atmospheric pressure. Gage pressure is a differential pressure that is a difference between a process fluid absolute pressure and the ambient atmospheric pressure.

The pressure measurement device 100 includes a field wiring compartment 108 with an electrical connector 110 coupled to a control system 112. A bus 114 provides serial communication and energization and is coupled to the electrical connector 110. An atmospheric pressure sensor module 116 connects to the bus 114 at the electrical connector 110. The bus 114 provides the energization to the atmospheric pressure sensor module 116. The bus 114 receives a serial communication signal 118 from the atmospheric pressure sensor module 116. The serial communication signal 118 includes numeric data 120 representing atmospheric pressure preferably combined with a label 121. The optional label 121 identifies the numeric data as an atmospheric pressure reading. The connections at the electrical connector 110 are described in more detail below in connection with examples illustrated in FIGS. 2–4. The atmospheric pressure sensor module 116 is described in more detail below in connection with an example illustrated in FIG. 6.

A circuit 122 receives the process sensor output 106 and receives the serial communication signal 118 from the bus 114. The circuit 122 providing a gage pressure output 124 that couples to the control system 112. The circuit 122 calculates the gage pressure output 124 as a calculated difference between the sensed absolute pressure 106 and the received numeric data 120. The pressure measurement device 100 is also able to generate an absolute pressure output and couple it to the control system.

The pressure measurement device 100 can be used alone, without the atmospheric pressure sensor module 116, as an absolute pressure measurement device. The atmospheric pressure sensor module 116 can be included and then the pressure measurement device 100 can be used as a gage pressure measurement device.

With this arrangement, it is possible for the manufacturer and end user to avoid having to manufacture or inventory gage pressure devices. The manufacturer or end user can inventory absolute pressure devices, and then add the atmospheric pressure sensor module 116, when needed, to effectively convert an absolute pressure device to a device that functions like a gage transmitter.

With this arrangement, it is also possible to conveniently calibrate absolute pressure measurement devices using a gage pressure standard such as a dead weight tester. During calibration, the atmospheric pressure sensor module 116 can be temporarily connected, and the pressure measuring device 100 provides a gage pressure output. Calibration can be conveniently performed because both the pressure sensing device 100 and the gage pressure standard both provide gage pressure outputs that can be conveniently compared. After calibration is complete, the atmospheric pressure sensor module 116 can be removed and the pressure sensing device 100 can revert back to providing an absolute pressure output to the control system which has been calibrated.

In one preferred arrangement, the pressure sensing device is configured to provide serial communications to the control system, and the serial communications include both absolute and gage pressure readings to the control system. In this preferred arrangement, the atmospheric pressure sensor module is connected to the pressure measurement device during normal operation, rather than temporarily during calibration.

Figure 2:
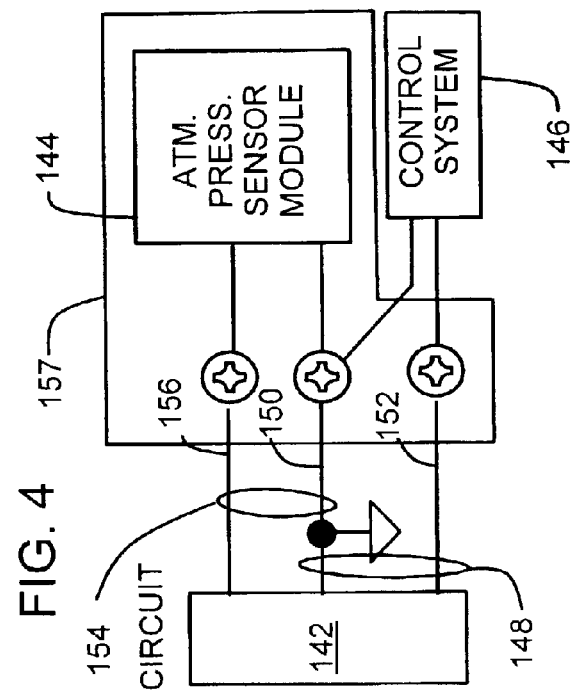
FIGS. 2–4 illustrate alternative bus connections between an electrical connector and an atmospheric pressure sensor module.
Figure 4:
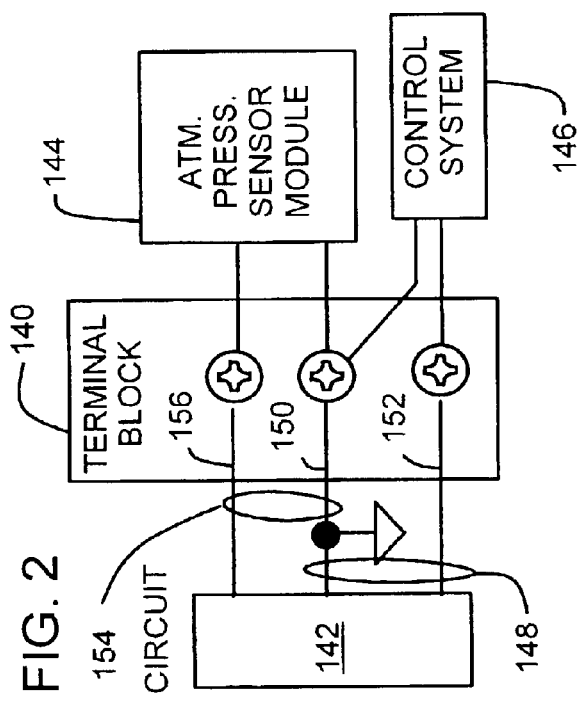
Figure 3:
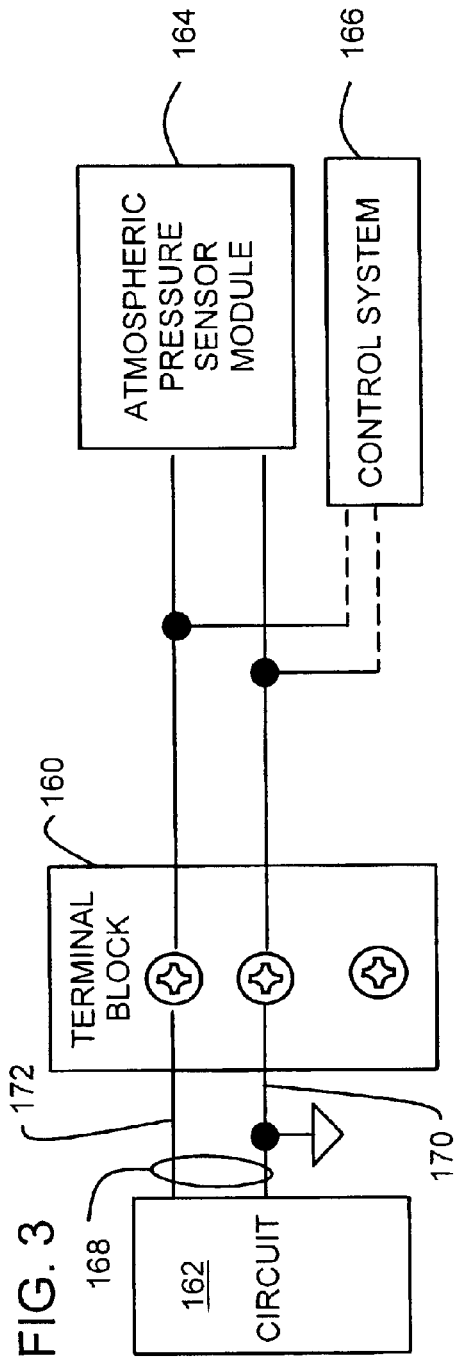

FIGS. 2–4 illustrate alternative bus connections between an electrical connector and an atmospheric pressure sensor module.

FIG. 2 illustrates wiring connections between an electrical connector 140, a circuit 142 (corresponding to circuit 122 in FIG. 1), an atmospheric pressure sensor module 144 (corresponding to module 116 in FIG. 1) and a control system 146 (corresponding to control system 112 in FIG. 1). The circuit 142 is connected to a control system bus 148 that includes bus conductor 152 and bus common conductor 150. The control system 146 is connected to the control system bus 148 and provides all of the electrical energization directly to circuit 142 as well as indirectly to the atmospheric pressure sensing module 144. The circuit 142 provides a gage pressure output along the control system bus 148 to the control system 146. As explained above in connection with FIG. 1, the circuit 142 can also provide an absolute pressure output along the control system bus 148 to the control system 146.

The circuit 142 is also connected to a local bus 154 that includes local bus conductor 156 and bus common conductor 150. The circuit 142 couples energization along the local bus 154 to the atmospheric pressure sensor module 144. The atmospheric pressure sensor module 144 couples a serial communication signal along the local bus 154 to the circuit 142.

In a preferred arrangement, the local bus 154 is arranged to carry serial communication signals formatted according to aspects of the Controller Area Network (CAN) protocol with a maximum bus length of about 30 meters. The local bus 154 can also preferably energize and communicate with other local peripherals such as a liquid crystal display module or a temperature sensor module. The control system bus 148 is preferably arranged to carry signals formatted for long distance transmission over hundreds of meters to the control system 146. The control system bus preferably comprises an industry standard bus for long distance transmission such as a 4–20 mA loop with serial communications superimposed using the HART protocol, PROFIBUS, FOUNDATION FIELDBUS or other industry standard protocols.

FIG. 3 illustrates wiring connections between an electrical connector 160, a circuit 162 (corresponding to circuit 122 in FIG. 1), an atmospheric pressure sensor module 164 (corresponding to module 116 in FIG. 1) and a control system 166 (corresponding to control system 112 in FIG. 1). The circuit 162 is connected to a control system bus 168 that includes bus conductor 172 and bus common conductor 170. The control system 166 is connected to the control system bus 168 and provides all of the electrical energization directly to circuit 162 as well as directly to the atmospheric pressure sensing module 164. The circuit 162 provides a gage pressure output along the control system bus 168 to the control system 166. As explained above in connection with FIG. 1, the circuit 162 can also provide an absolute pressure output along the control system bus 168 to the control system 166.

In a preferred arrangement, the control system bus 168 preferably comprises an industry standard multidrop bus for long distance transmission such as a multidrop current loop with serial communications superimposed using the HART protocol, PROFIBUS, FOUNDATION FIELDBUS or other industry standard multidrop protocols. In the arrangement shown in FIG. 3, a single atmospheric pressure sensor module 164 can provide a serial communication signal to a plurality of multidrop pressure measurement devices connected to the multidrop bus 168.

The arrangements shown in FIGS. 2–4 are some examples of wiring arrangements, however, other wiring arrangements can be used as well using any number of terminals on an electrical connector.

FIG. 4 illustrates an arrangement that is similar to the arrangement in FIG. 2. Reference numbers used in FIG. 4 that are the same as reference numbers used in FIG. 2 identify the same or similar features. In FIG. 4, the atmospheric pressure sensor 144 is integrated into the electrical connector to form a unitized assembly 157. With the arrangement shown in FIG. 4, a pressure measurement device that provides an absolute pressure output can be upgraded to provide a gage pressure output simply by replacing the electrical connector 140 shown in FIG. 2 with a unitized assembly 157 as shown in FIG. 4.

An atmospheric pressure sensor module 116, 144, 164 can be installed inside the field wiring compartment 108 and become part of the pressure sensing device 100. Alternatively, an atmospheric pressure sensor module 116, 144, 164 can be installed outside the transmitter.

The atmospheric pressure typically changes slowly and updates of the serial communication signal 120 need only be provided once every several minutes or during calibration. The atmospheric pressure sensor module 116 consumes energy to generate the serial communication signal 120. In some applications, it may be preferred to put the atmospheric pressure sensor module 116 in a sleep mode when updates are not needed as illustrated in a preferred timing diagram shown in FIG. 5.

FIG. 5 illustrates a timing diagram of sleep and awake modes of an atmospheric pressure sensor module. In FIG. 5, the horizontal axes 190, 192 represent time and a first vertical axis 194 represents presence of various signals on a bus connecting an atmospheric pressure sensor module to a circuit. A second vertical axis 196 represents magnitude of energy consumption 198 in an atmospheric pressure sensor module. The atmospheric pressure sensor module produces updated serial communication signals 200 until such time as a circuit (such as circuit 122, 142, 162) transmits a serial sleep signal 202 over a bus to the atmospheric pressure sensor module. The atmospheric pressure sensor module responds to the serial sleep signal 200 by stopping production of serial communication signals 200 as illustrated at 204. When the circuit again needs updated serial communication signals, the circuit transmits a serial awake signal 206 over the bus to the atmospheric pressure sensor module. The atmospheric pressure sensor module responds to the serial awake signal 206 by restarting production of communication signals as illustrated at 208. The energy consumption 198 is lower when the updated serial communication signals are not being generated. The arrangement reduces power consumption by the atmospheric pressure sensor module.

In one preferred arrangement, power savings are achieved by an atmospheric pressure sensor module that is self-timed to alternate between sleep and awake modes of operation. The atmospheric pressure sensor module automatically puts itself into a sleep mode, consuming just enough power to run its self timer. The atmospheric pressure sensor module automatically awakes itself long enough to make a measurement and transmit the result and then returns to the sleep mode.

The circuit provides a sleep signal 202 to the bus indicating that serial communication signal updates are not needed, and the atmospheric pressure sensor module stops providing the serial communication signal. The circuit provides an awake signal 206 to the bus indicating that serial communication signal updates are needed, and the atmospheric pressure sensor module starts providing the serial communication signal. A preferred arrangement of the circuit is illustrated in an example discussed below in connection with FIG. 6.

Figure 6:
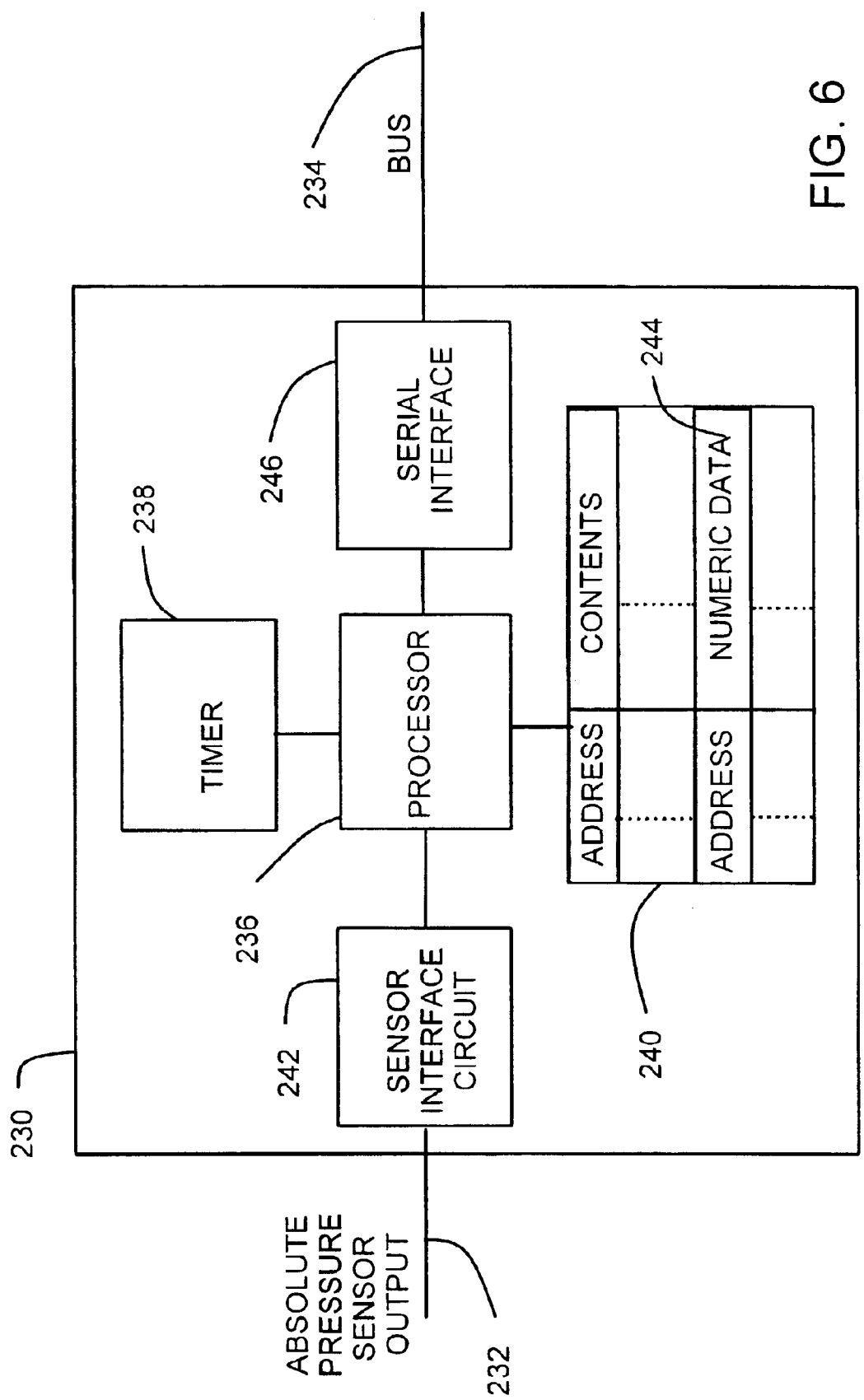
FIG. 6 illustrates a block diagram of an embodiment of a pressure measurement device circuit.

FIG. 6 illustrates a block diagram of an embodiment of a pressure measurement device circuit 230. Circuit 230 corresponds with circuit 122 in FIG. 1. The circuit 230 receives an absolute pressure sensor output 232 and couples to a bus 234. The circuit 230 includes a processor 236 that couples to a timer 238 and memory 240. A sensor interface circuit 242 interfaces the pressure sensor output 232 with the processor 236. A serial interface circuit 246 interfaces the bus 234 with the processor 236. The processor 236 is typically a low power microprocessor. The memory 240 typically includes elements of memory with varying degrees of volatility such as RAM, ROM and EEPROM.

The memory 240 includes a volatile memory location 244 storing numeric data that is received from the bus 234 and that represents atmospheric pressure. The processor 236 in cooperation with an executive program stored in nonvolatile memory elements in memory 240 functions as an update circuit updating the memory location 244 when an updated serial communication signal is received from bus 234. The processor 236 preferably recognizes the received numeric data as numeric data by the label attached to the numeric data.

The timer 238 providing a count to the processor 236 that is representative of a length of operating time since the last numeric data representing atmospheric pressure was received.

The processor 236 in cooperation with an executive program stored in nonvolatile memory elements in memory 240 functions as a reset circuit resetting the memory location 244 to a predetermined value when the operating time exceeds a predetermined length of time. If the serial communication signal is not available for a length of time set by the timer 238, then the memory location is reset to a preselected value. In one preferred arrangement, the reset circuit resets the memory location 244 to a value representative of 1 standard atmosphere of pressure. In another preferred arrangement, the reset circuit resets the memory location 244 to an out-of-range value representing an error message.

Figure 7:
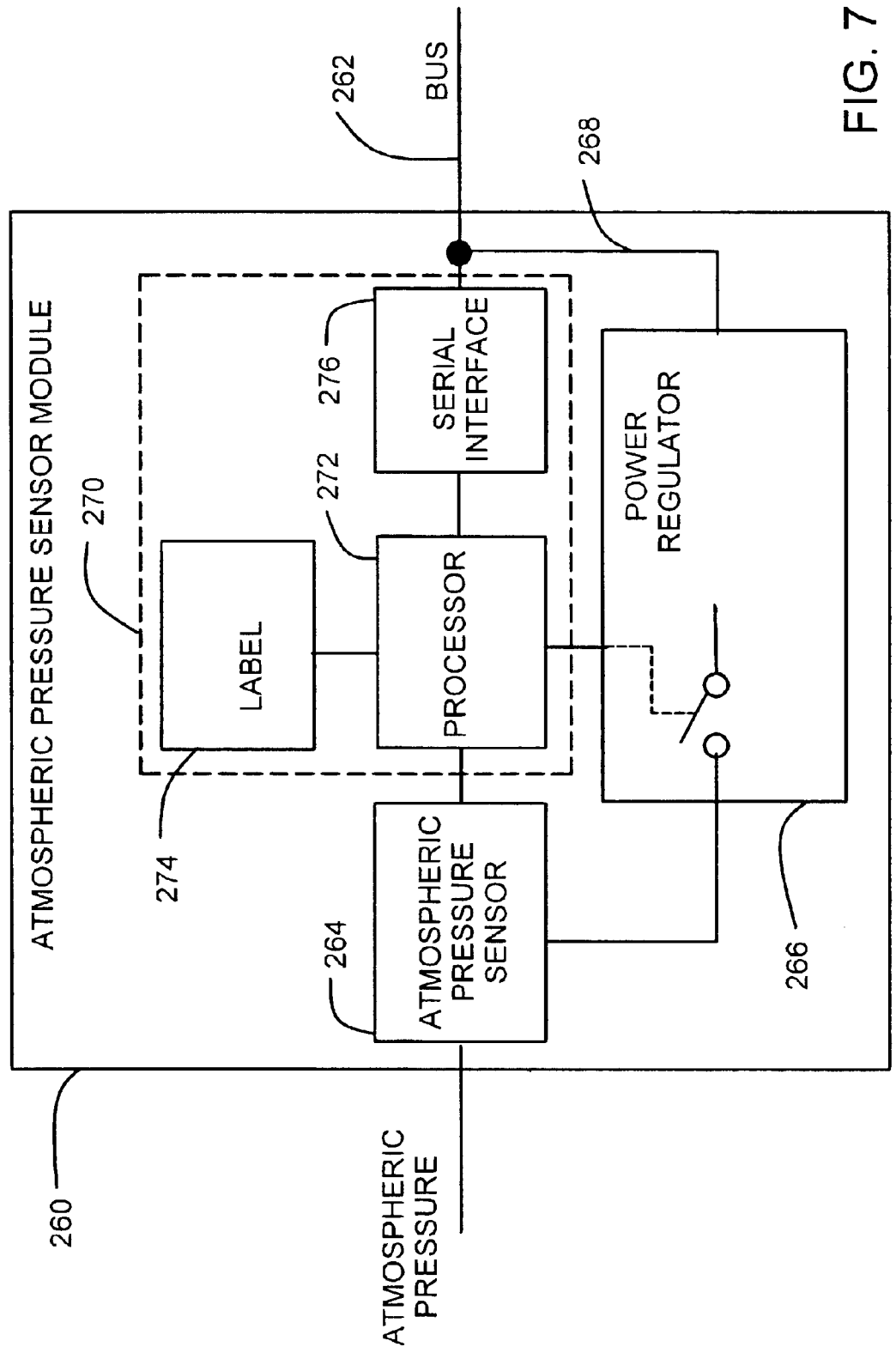
FIG. 7 illustrates a block diagram of an embodiment of an atmospheric pressure sensing module.

FIG. 7 illustrates a block diagram of an embodiment of an atmospheric pressure sensing module 260 that connects to a bus 262 at a pressure measurement device electrical connector. The atmospheric pressure sensing module 260 includes an atmospheric pressure sensor 264. A power regulator 266 receives power from the bus on line 268. An atmospheric sensing circuit 270 preferably comprises a processor 272 coupled to a label 274 stored in memory, a serial interface 276 coupled to the bus 262. The atmospheric sensing circuit 270 is powered by the bus 262 and couples to the atmospheric pressure sensor 264. The atmospheric sensing circuit 270 provides a serial communication signal including numeric data representing atmospheric pressure combined with the label 274 to the bus 262 by way of the serial interface 276. The power regulator 266 is controlled by the processor 272 to respond to serial sleep and awake signal received from the bus 262. The power regulator 266 responds to the awake and sleep signals by energizing and deenergizing energization of the atmospheric pressure sensor 264.

The atmospheric sensor circuit 260 stops providing the serial communication signal after the pressure measurement device provides a sleep signal to the bus 262 indicating that serial communication signal updates are not needed. The atmospheric pressure sensing module 260 has a power consumption from the bus and the atmospheric sensing circuit 260 reduces the power consumption after the sleep signal is received. The atmospheric sensing circuit 260 starts providing the serial communication signal after the pressure measurement device provides an awake signal to the bus 262 indicating that serial communication signal updates are needed.

In an alternate preferred arrangement, the atmospheric sensing circuit 260 can include a processor 272 that includes a sleep timer and the atmospheric sensing circuit 260 is self timed by the processor 272 rather than relying on timing signals from the bus 262.

Figure 8:
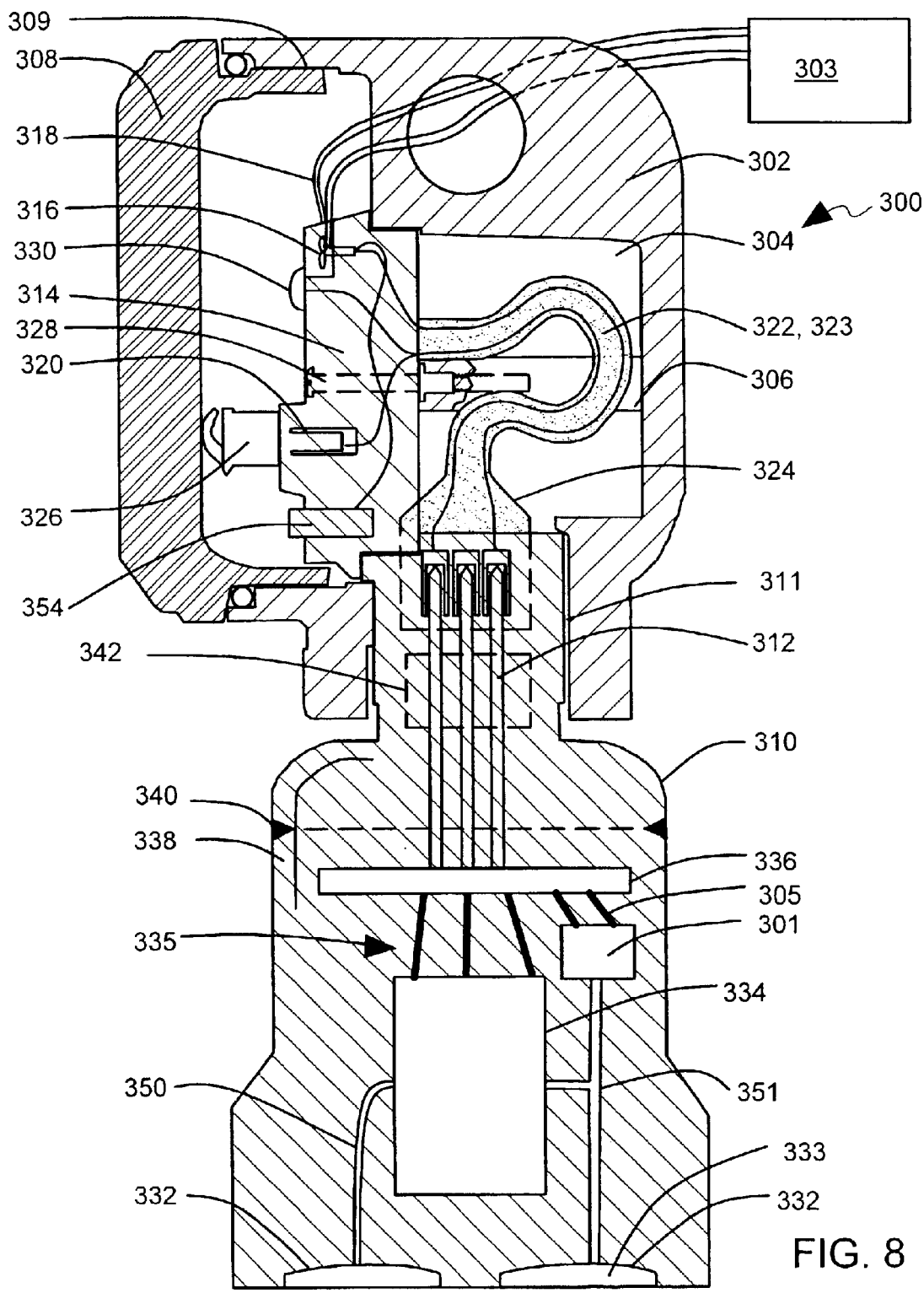
FIG. 8 illustrates a dual inlet pressure transmitter that includes an absolute pressure sensor sensing a process line pressure.

FIG. 8 illustrates an embodiment of a differential process fluid transmitter 300 that includes a line pressure sensor 301 that senses absolute pressure at a process inlet 333.

Transmitter 300 includes a field wiring housing 302 that surrounds a wiring compartment 304. The wiring housing 302 can be formed of a metal such as aluminum or stainless steel. Mounting members, such as ears 306, are formed inside the wiring compartment 304, and a compartment cover 308 is threaded and engages corresponding threads inside the wiring compartment as illustrated at 309.

A permanently sealed transmitter assembly 310 is threaded and engages corresponding threads inside the wiring compartment as illustrated at 311. As illustrated, transmitter assembly 310 is a differential pressure transmitter assembly and includes sealed isolator diaphragms 332, a differential pressure sensor 334 connected by electrical leads 335, an absolute pressure sensor 301 and one or more printed circuit boards 336. The isolator diaphragms 332 in the process inlets are coupled to the differential pressure sensor 334 by lines 350, 351 that are filled with isolator fluid. Line 351 also couples line pressure to the absolute pressure sensor 301. The transmitter assembly 310 has a transmitter electrical connector 312 that is accessible inside the wiring compartment 304. Transmitter assembly 310 has an outer metal housing 338 that is permanently welded shut at weld 340 and a hermetically sealed feedthrough 342 surrounding the transmitter electrical connector 312. The printed circuit board 336 inside the transmitter assembly 310 is thus permanently sealed and protected from the atmosphere surrounding the transmitter 300.

Transmitter 300 also includes an electrical connector 314. Electrical connector 314 includes terminals 316 that are adapted for electrical connection to field wiring 318. Field wiring 318 typically uses long distance signalling comprises HART serial communication over a two wire 4–20 mA industrial control loop that energizes transmitter 300 and provides remote electrical transmission of process fluid variables sensed by transmitter assembly 310, but can also comprise various know industrial busses such as FOUNDATION FIELDBUS, PROFIBUS or various other know communication protocols, wired as explained in connection with FIGS. 2–4 above. In one embodiment, screws 328 mount the electrical connector 314 to the mounting ears 306. Preferably, the electrical connector 314 also can include sealed programming jumper assemblies 320 and sealed programming pushbutton switches 330. The jumper assemblies 320 each include a removable jumper body 326 that can be inserted in one of several orientations for programming. The electrical connector 314 also preferably includes a sealed cable 322 that terminates in a sealed plug 324 that plugs into the transmitter electrical connector 312 and seals to the body of transmitter assembly 310.

The transmitter 300 includes the field wiring compartment 304 with the electrical connector 314 coupled to a control system 303. Sealed cable 322 includes a bus 323 that provides serial communication and energization and is coupled to the electrical connector 314. An atmospheric pressure sensor module 354 connects to the bus 323 at the electrical connector 314. The atmospheric pressure sensor module 354 is preferably integrated into the electrical connector 314 to form a unitized assembly as illustrated. The bus 323 provides the energization to the atmospheric pressure sensor module 354. The bus 323 receives a serial communication signal from the atmospheric pressure sensor module 354. The serial communication signal includes numeric data representing atmospheric pressure combined with a label that identifies the numeric data as an atmospheric pressure reading.

Transmitter 300 provides a differential pressure output to the communication bus 318 and also provides a line pressure output to the bus 318. The line pressure output is sensed by absolute pressure sensor 301. The line pressure output can be the sensed absolute pressure, a calculated gage pressure using a serial communication signal from the atmospheric pressure sensor module 354, or both. If desired, one of the programming jumper assemblies 320 or one of the pushbuttons switches can be used to select either an absolute or gage indication of the line pressure.

The circuit 336 receives the process sensor output 305 and receives the serial communication signal from the bus 318. The circuit 336 providing a gage pressure output that couples to the control system 303. The circuit 336 calculates the gage pressure output provided to bus 318 (comparable to output 124 in FIG. 1) as a calculated difference between the sensed absolute pressure 305 and the received numeric data. The pressure measurement device 300 is also able to generate an absolute pressure output and couple it to the control system.

The transmitter 300 can be used alone, without the atmospheric pressure sensor module 354, and provide an absolute pressure measurement of the line pressure. The atmospheric pressure sensor module 354 can be included and then the pressure transmitter 300 can also provide a gage pressure measurement of the line pressure at inlet 333.

Figures 9, 10:
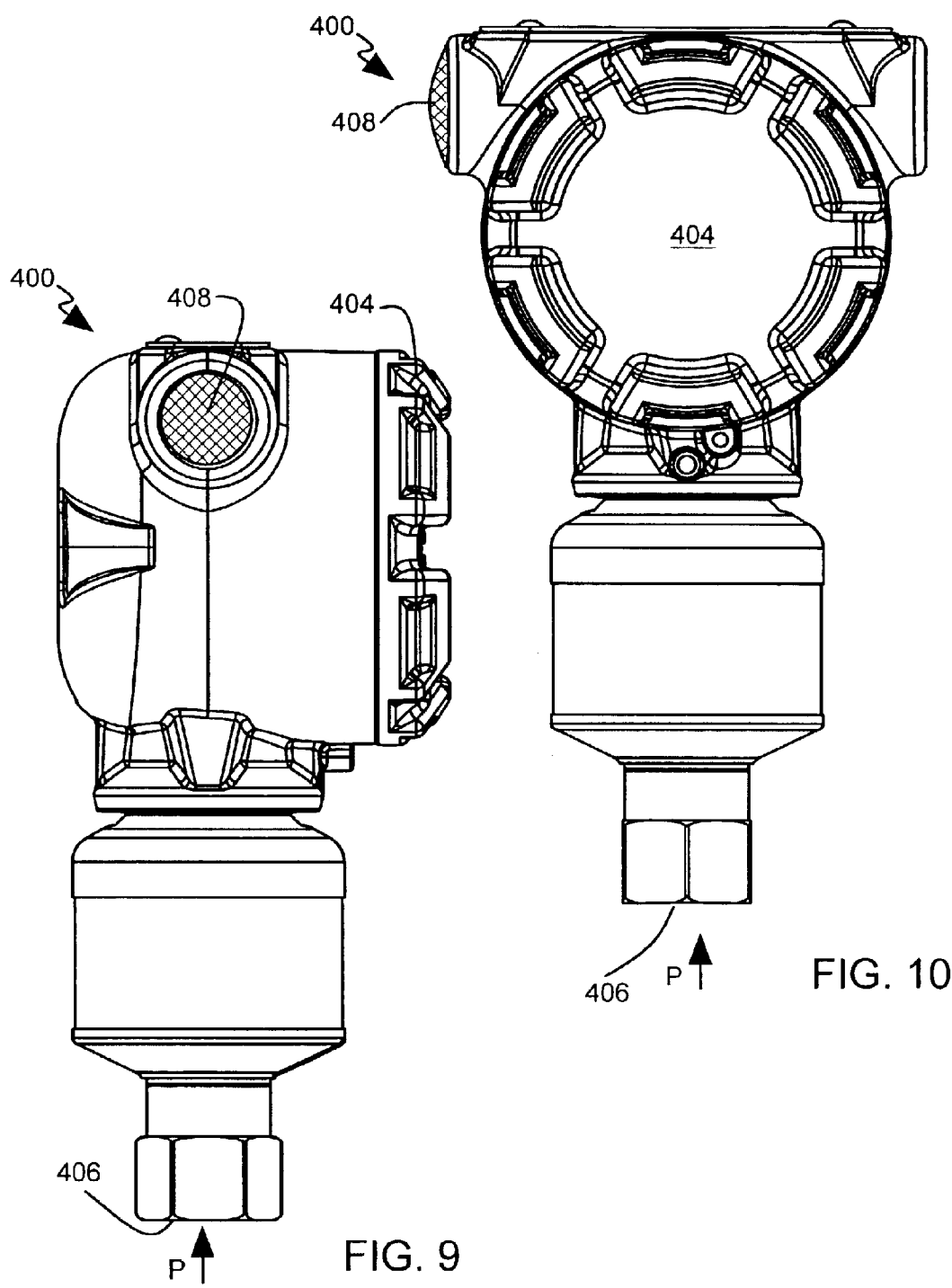
FIGS. 9–11 illustrate a single inlet pressure transmitter sensing a process line pressure with an absolute pressure sensor.
Figure 11:
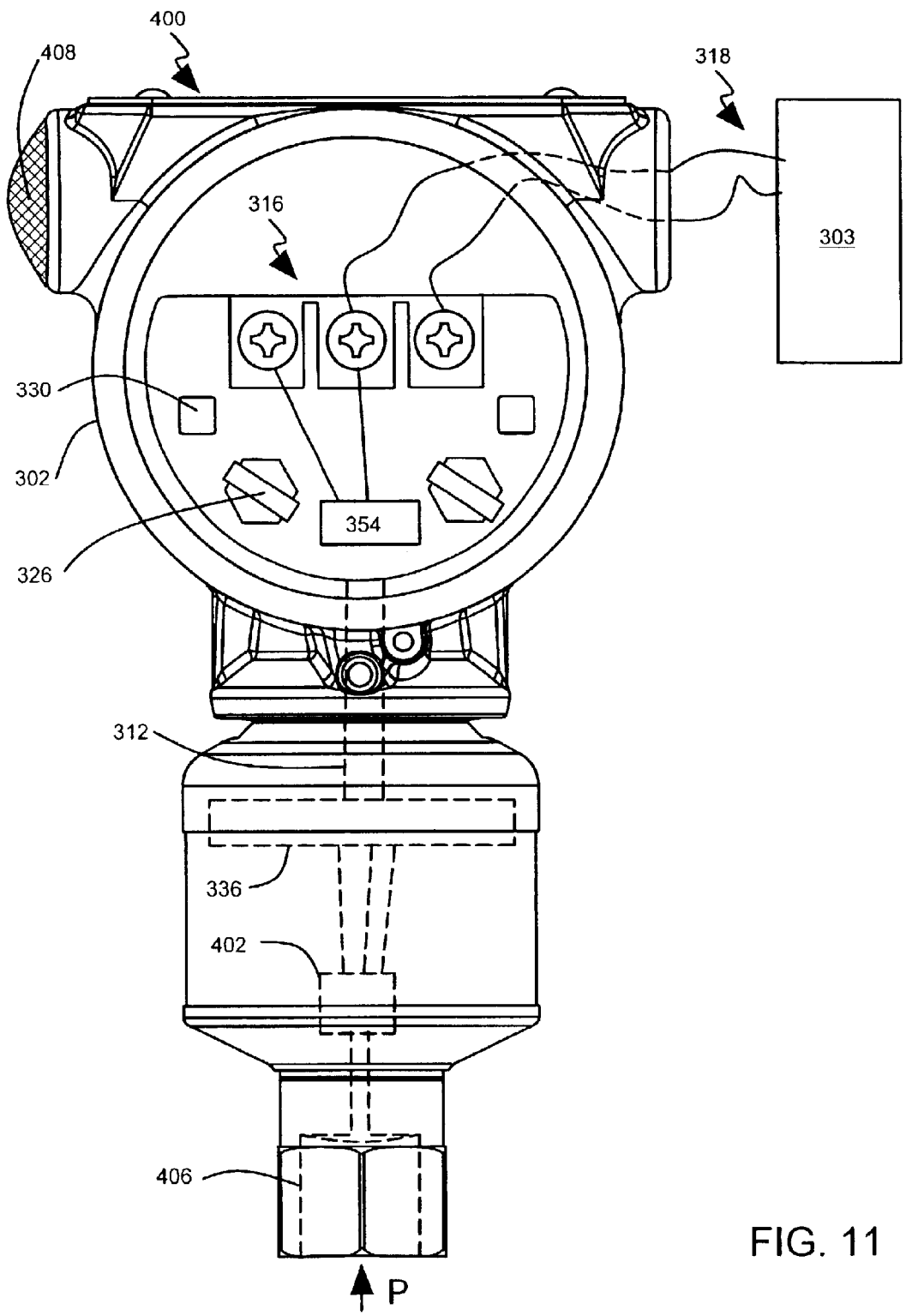

FIGS. 9–11 illustrate a single inlet pressure transmitter 400 sensing a process line pressure P at an inlet 406 with an absolute pressure sensor 402. FIGS. 9 and 10 illustrate side and front views, respectively of one embodiment of pressure transmitter 400 with its wiring compartment cover 404 in place. One of two threaded electrical conduit opening has been filled with an optional flameproof screen 408. Flameproof screen 408 allows air flow between a wiring compartment 304 and the surrounding atmosphere. The wiring compartment 304 is thus maintained at atmospheric pressure.

The transmitter 400 illustrated in FIGS. 9–11 is a pressure measurement device that is similar in many respects to the transmitter illustrated in FIG. 8. Reference numbers in FIG. 11 that are the same as reference numbers used in FIG. 8 identify the same or similar features.

Figure 12:
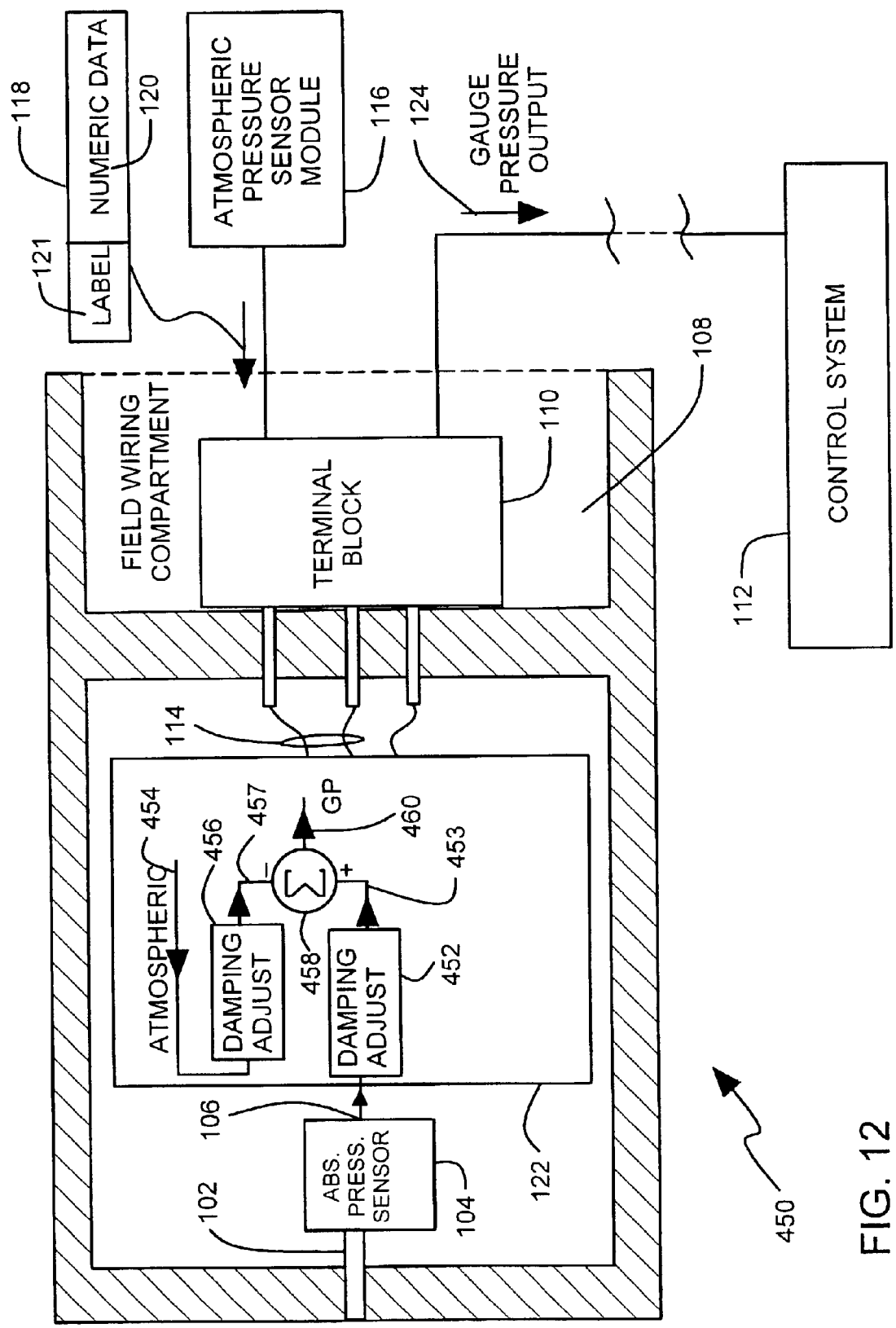
FIG. 12 illustrates an alternate embodiment of a pressure measurement device with different damping adjustments for absolute and atmospheric pressure sensors.

FIG. 12 illustrates an alternate embodiment of a pressure measurement device 450 with different damping adjustments for absolute and atmospheric pressure sensors. Reference numbers used in FIG. 12 that are the same as reference numbers used in FIG. 1 refer to the same or similar features. In FIG. 12, a process sensor output 106 that represents absolute pressure of a process fluid is coupled to a first damping circuit 452 that provides adjustable damping.

An output 453 of the first damping circuit 452 represents absolute pressure but is smoothed by a first adjustable damping factor that is preferably user adjustable. An output 454 of the atmospheric pressure sensor 454 is coupled to a second damping circuit 456 that provides adjustable damping. An output 457 of the second damping circuit 456 represents atmospheric pressure but is smoothed by a second adjustable damping factor that is preferably user adjustable. The damped outputs 453, 457 are coupled to a summing junction 458 where the damped atmospheric output 457 is subtracted from the damped absolute pressure output 453 to generate a gage pressure output 460. The first damping factor can be adjusted to be different from the second damping factor. This arrangement has the advantage that the atmospheric pressure reading can be heavily damped to filter out atmospheric noise such as the opening and closing of doors or wind gusts without adversely affecting the fast response time of the absolute pressure reading that is only lightly damped. In a preferred arrangement, the gage pressure GP=K1(Absolute pressure)−K2(atmospheric pressure), where K1 and K2 are damping factors. The desired fast response to process pressure changes is maintained while noise in the atmospheric pressure is filtered out.

Figure 13:
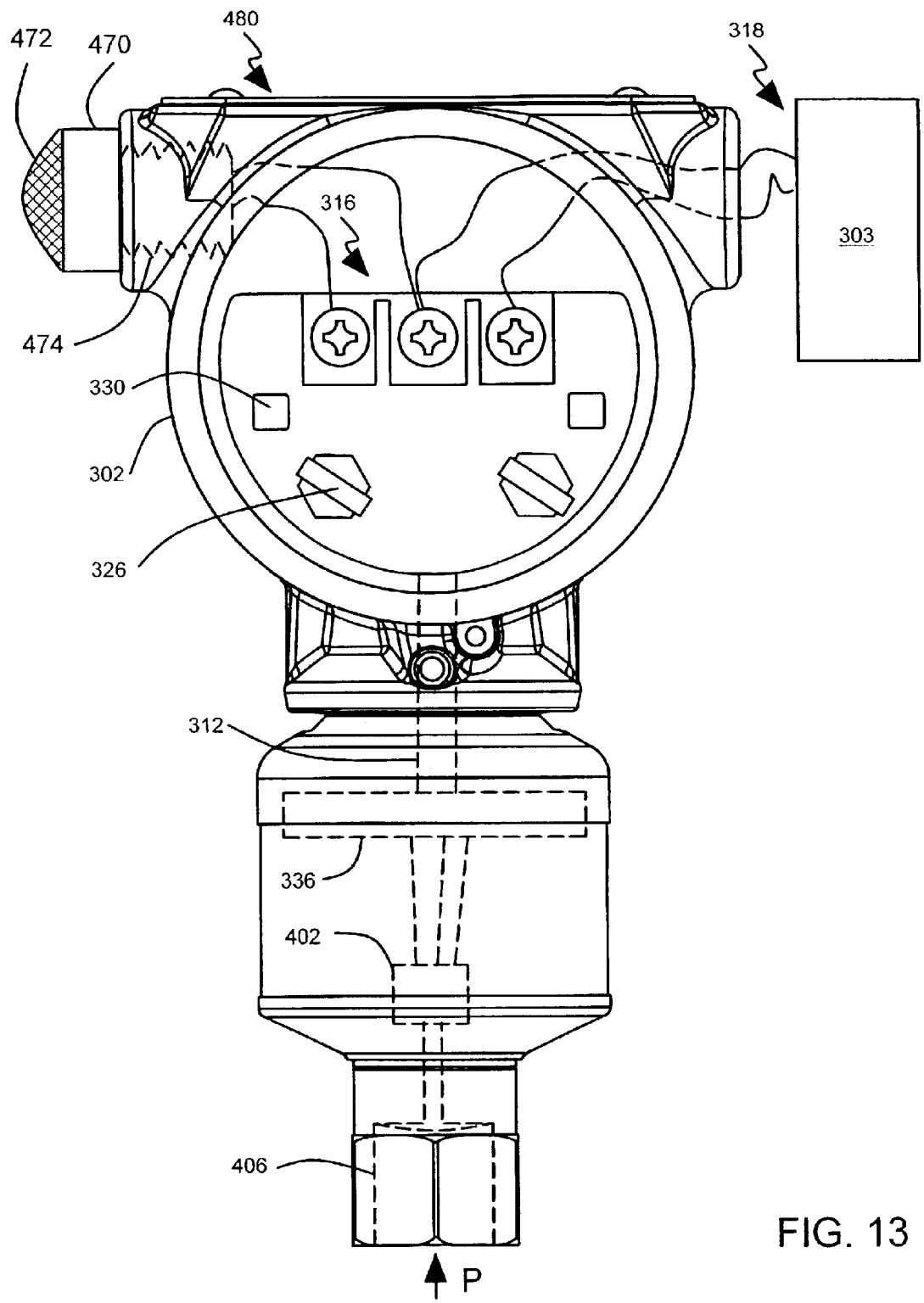
FIG. 13 illustrates an atmospheric pressure sensor module that mounts in a conduit opening of a pressure measurement device.

FIG. 13 illustrates an atmospheric pressure sensor module 470 that is threaded with threads 474 and mounts in a threaded conduit opening of a pressure measurement device 480. The threads 474 engage the threaded conduit opening to provide a flameproof seal and maintain the integrity of the explosion-proof features of the wiring conduit system of pressure measurement device 480. In a preferred arrangement, the atmospheric pressure sensor module 470 includes a flameproof screen that separates the surrounding environment from circuitry in the atmospheric pressure sensor module 470. The pressure measurement device 480 is similar to the pressure measurement device 400 of FIG. 11 and reference numbers in FIG. 13 that are the same as reference numbers used in FIG. 11 identify the same or similar features.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the pressure measurement device while maintaining substantially the same functionality without departing from the scope of the present invention. The teachings of the present invention can be applied to other pressure measuring instruments without departing from the scope of the present invention.

What is claimed is:

1. A pressure measurement device, comprising:
    an inlet couplable to a pressurized process fluid;
    an absolute pressure sensor coupled to the inlet and providing a process sensor output representing absolute pressure of the process fluid;
    a field wiring compartment with an electrical connector couplable to a control system;
    a bus coupled to the electrical connector and providing serial communication and energization to the pressure measurement device;
    an atmospheric pressure sensor module connected to the bus at the electrical connector, the bus providing the energization to the atmospheric pressure sensor module and the bus receiving a serial communication signal from the atmospheric pressure sensor module, the serial communication signal including numeric data representing atmospheric pressure; and
    a circuit coupled to the bus at the electrical connector and receiving the process sensor output and receiving the serial communication signal from the bus, the circuit providing a gage pressure output couplable to the control system as a calculated difference between the sensed absolute pressure and the received numeric data.

2. The pressure measurement device of claim 1 wherein the bus is a local bus and the pressure measurement device couples the gage pressure output to the control system by a control system bus.

3. The pressure measurement device of claim 1 wherein the bus is a control system bus and the pressure measurement device couples the gage pressure output to the control system by the control system bus.

4. The pressure measurement device of claim 1 wherein the atmospheric pressure sensor module is installed inside the field wiring compartment.

5. The pressure measurement device of claim 2 wherein the atmospheric pressure sensing module and the electrical connector are a unitized assembly.

6. The pressure measurement device of claim 1 wherein the circuit provides a sleep signal to the bus indicating that serial communication signal updates are not needed, and the atmospheric pressure sensor module stops providing the serial communication signal.

7. The pressure measurement device of claim 1 wherein the circuit provides an absolute pressure output to the control system.

8. The pressure measurement device of claim 1 wherein the circuit provides an awake signal to the bus indicating that serial communication signal updates are needed, and the atmospheric pressure sensor module starts providing the serial communication signal.

9. The pressure measurement device of claim 1 further comprising different damping adjustments for absolute and atmospheric pressure sensors.

10. A pressure measurement device, comprising:
    an inlet couplable to a pressurized process fluid;
    an absolute pressure sensor coupled to the inlet and providing a process sensor output representing absolute pressure of the process fluid;
    a field wiring compartment with an electrical connector couplable to a control system;
    a bus providing serial communication and energization coupled to the electrical connector; and
    a circuit receiving the process sensor output and coupled to the bus for receiving a serial communication signal from the bus, the serial communication signal including numeric data representing atmospheric pressure, the circuit providing a gage pressure output couplable to the control system as a calculated difference between the sensed absolute pressure and the received numeric data.

11. The pressure measurement device of claim 10 wherein the bus provides the energization to an atmospheric pressure sensor module and the bus receives the serial communication signal from the atmospheric pressure sensor module.

12. The pressure measurement device of claim 10 wherein the circuit provides a sleep signal to the bus indicating that serial communication signal updates are not needed.

13. The pressure measurement device of claim 10 wherein the circuit provides an awake signal to the bus indicating that serial communication signal updates are needed.

14. The pressure measurement device of claim 10 wherein the bus is a local bus and the pressure measurement device couples the gage pressure output to the control system by a control system bus.

15. The pressure measurement device of claim 10 wherein the bus is a control system bus and the pressure measurement device couples the gage pressure output to the control system by the control system bus.

16. The pressure measurement device of claim 10 wherein the circuit provides an absolute pressure sensor output to the control system.

17. The pressure measurement device of claim 10 wherein the circuit further comprises:
   a memory location storing the received numeric data representing atmospheric pressure; and
   an update circuit updating the memory location when the serial communication signal is received.

18. The pressure measurement device of claim 17 wherein the circuit further comprises:
   a timer providing a count representative of a length of operating time since the last numeric data representing atmospheric pressure was received; and
   a reset circuit resetting the memory location to a predetermined value when the operating time exceeds a predetermined length of time.

19. The pressure measurement device of claim 18 wherein the reset circuit resets the memory location to a value representative of 1 standard atmosphere of pressure.

20. The pressure measurement device of claim 18 wherein the reset circuit resets the memory location to an out-of-range value representing an error message.

* * * * *